(12) United States Patent
Nagatsuka

(10) Patent No.: US 6,411,596 B1
(45) Date of Patent: Jun. 25, 2002

(54) MAGNETO-OPTICAL DISK CARTRIDGE AND MAGNETO-OPTICAL DISK APPARATUS

(75) Inventor: Osamu Nagatsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/524,256

(22) Filed: Mar. 14, 2000

(30) Foreign Application Priority Data

Mar. 16, 1999 (JP) .......................................... 11-070391
Mar. 24, 1999 (JP) .......................................... 11-080106

(51) Int. Cl.$^7$ ................................................. G11B 5/84
(52) U.S. Cl. ...................................................... 369/291
(58) Field of Search .......................... 360/133; 369/291

(56) References Cited

U.S. PATENT DOCUMENTS

| | | | | |
|---|---|---|---|---|
| 5,040,167 A | * | 8/1991 | Tanaka et al. ............... | 369/291 |
| 5,850,384 A | * | 12/1998 | Ohmori et al. .............. | 360/133 |
| 6,094,326 A | * | 7/2000 | Ikebe et al. ................. | 369/291 |
| 6,215,761 B1 | * | 4/2001 | Goto et al. .................. | 369/291 |
| 6,243,355 B1 | * | 6/2001 | Ikebe et al. ................. | 360/133 |
| 6,269,074 B1 | * | 7/2001 | Funawatari et al. ........ | 360/133 |
| 6,272,094 B1 | * | 8/2001 | Nishino et al. ............. | 360/133 |
| 6,288,999 B1 | * | 9/2001 | Goto et al. .................. | 369/291 |

* cited by examiner

Primary Examiner—Allen Cao
(74) Attorney, Agent, or Firm—Fitzpatrick, Cella, Harper & Scinto

(57) ABSTRACT

A magneto-optical disk cartridge housing a magnetic field modulation type magneto-optical disk comprises a main body, an aperture provided on the main body, and a shutter for opening and closing the aperture, wherein a length W1 of a side of the main body in an opening and closing direction of the shutter, a length W2 of a side of the main body in a direction perpendicular to the opening and closing direction, a length C1 of the aperture in the opening and closing direction, and a length C2 of the aperture in the direction perpendicular to the opening and closing direction satisfy the inequality relations:

$$C1 < W1/2, \quad C2 > W2/2.$$

A magneto-optical disk apparatus for recording and reproducing information to or from the magneto-optical disk comprises an insertion opening for inserting the cartridge, a magnetic field modulation head to be inserted into the aperture, and an optical pickup movable together with the head, wherein the directions of access of the head and the optical pickup to a target track of the magneto-optical disk, the direction of insertion of the magneto-optical disk cartridge, and the direction of movement of the shutter for opening and closing are parallel to each other.

4 Claims, 7 Drawing Sheets

MAGNETO-OPTICAL DISK CARTRIDGE AND MAGNETO-OPTICAL DISK APPARATUS

BACKGROUND OF THE INVENTION

1. Field of the Invention

The present invention relates to a magneto-optical disk cartridge housing a magneto-optical disk of a magnetic field modification recording system, and a magneto-optical disk apparatus in which the cartridge is put away.

2. Related Background Art

The direct overwriting type of magneto-optical disks are classified into two types: a light modulation type, and a magnetic field modulation type. The light modulation type magneto-optical disk records information by switching the magnetization direction of a magnetic layer by projection of a laser light beam modified in accordance with record signals on the magnetic layer under application of a constant auxiliary magnetic field. The magnetic field modulation type magneto-optical disk records information by switching the magnetization direction of the magnetic layer by application of an auxiliary magnetic field modified in accordance with record signals under projection of successive light or pulsed light. The light modulation type magneto-optical disk is effective in constructing a magneto-optical disk system having a high transfer rate, because of its capability of extremely high speed modulation of the laser beam. On the other hand, the magnetic field modulation type magneto-optical disk is effective in stabilization of the system and high density recording, because of the capability of stable precise pit formation without influence of skew of the disk.

Figure 1:
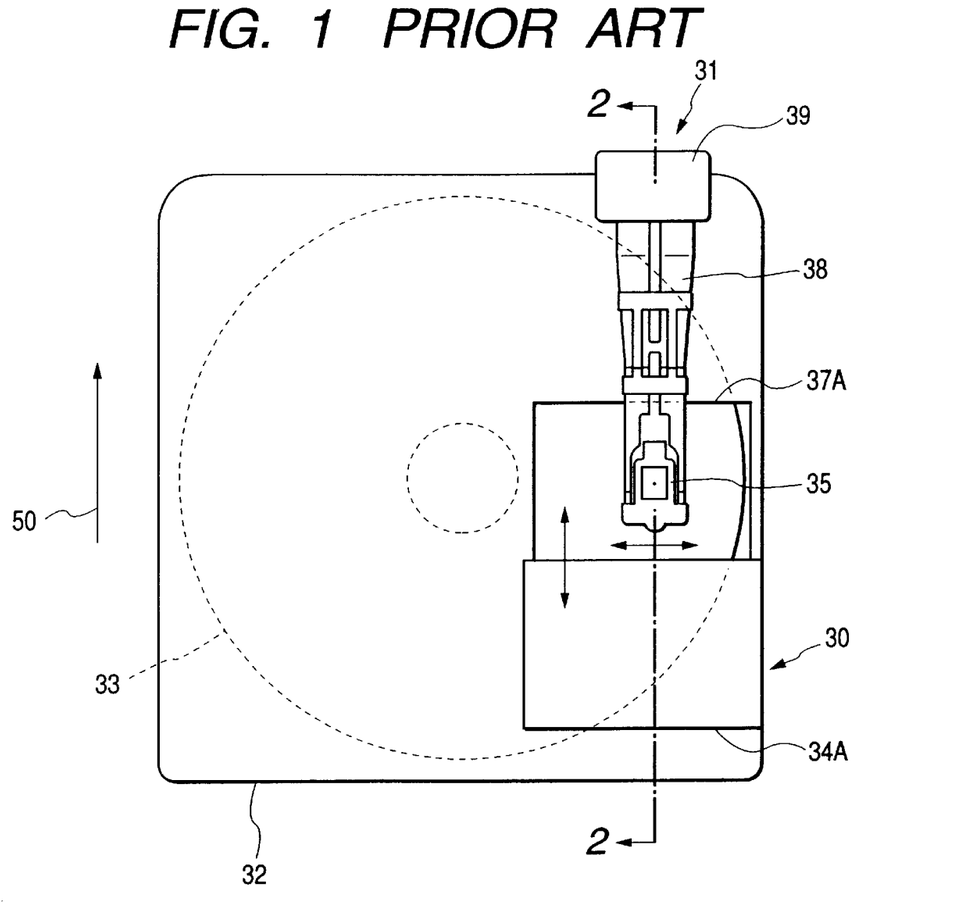
FIG. 1 is a plan view of a conventional magneto-optical disk cartridge and magneto-optical disk apparatus.
Figure 2:
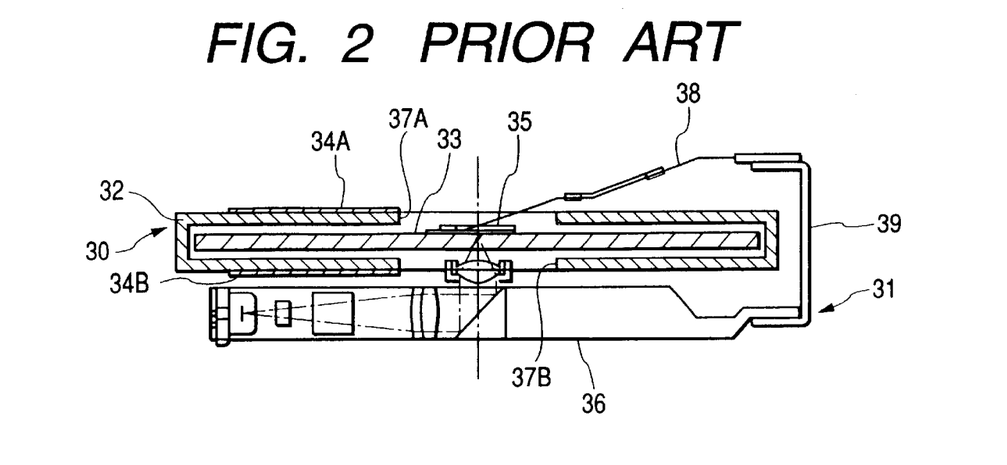
FIG. 2 is a sectional view taken along line 2—2 in FIG. 1.

As the magnetic field modulation type magneto-optical disk apparatus, information recording-reproducing apparatuses typified by minidisk apparatuses are known (called MD). FIG. 1 and FIG. 2 illustrate the main portion of such an information recording-reproducing apparatus: FIG. 1 is a plan view, and FIG. 2 is a sectional view taken on line 2—2 in FIG. 1. Main body 32 of magneto-optical disk cartridge 30 houses magneto-optical disk 33 rotatably. Cartridge main body 32 has aperture 37A on its upper face for insertion of magnetic field modulation head 35, and has another aperture 37B on its lower face for introduction of the laser light beam emitted from optical pickup 36. Apertures 37A and 37B are closable by shutters 34A and 34B, the shutters being movable in the direction parallel to the insertion direction of magneto-optical disk cartridge 30.

Magnetic field modulation head 35 is held elastically by suspension 38 as an elastic holding means. This suspension 38 is fixed perpendicularly to the longitudinal direction of aperture 37A. The one end of suspension 38 and optical pickup 36 are fixed to support 39. Support 39 is moved perpendicularly to the direction of opening-closing of the shutters to move magnetic field modulation head 35 and optical pickup 36 together in the direction of the diameter of magneto-optical disk 33. Arrow mark 50 shows the direction of insertion of disk cartridge 30 into magneto-optical disk apparatus 31. This type of magneto-optical disk apparatus 31 can be made shorter in depth direction.

The above conventional magneto-optical disk apparatus 31, although it can be made compact in the depth direction, has a disadvantage. Specifically, in the conventional magneto-optical disk apparatus 31, the longitudinal direction of suspension 38 is perpendicular to the longitudinal direction of aperture 37A, so that suspension 38 can be made longer even though the aperture 37A has a small width. However, owing to the smaller length in the short direction (width direction) of aperture 37A, suspension 38 is naturally slanted at a larger angle as shown in FIG. 2, whereby magnetic field modulation head 35 can be affected by positional deviation of the face of magneto-optical disk 33, disadvantageously.

Figure 3:
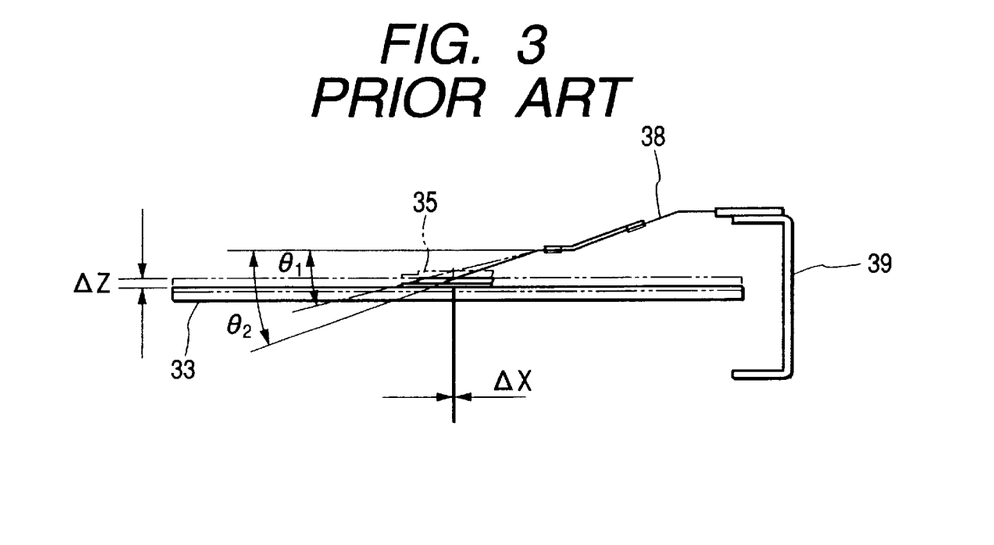
FIG. 3 is a drawing for explaining the influence of deviation of the face of magneto-optical disk 33.

Suppose that suspension 38 is slanted at an angle of θ1 to the face of magneto-optical disk 33, and the face of magneto-optical disk 33 comes to deviate by a dimension ΔZ as shown in FIG. 3. Thereby, a core of magnetic field modulation head 35 (hereinafter also referred to as "head core") will be displaced by ΔX=ΔZ×tan θ1 as a lateral component. This displacement hinders precise access of the head core to a target track. In order to avoid this difficulty, the length of the head core may be made sufficiently longer to cover a larger range of the track. However, the larger length of the head core decreases magnetomotive force of the head core per unit area, resulting in a drop in the magnetic field intensity, which requires an increase in the driving current to compensate for a drop in the magnetic field. Further, the longer length of the head core causes an increase in the inductance L of the head core, an increase in impedance Z at high frequency, and an increase in power consumption and heat generation, disadvantageously.

SUMMARY OF THE INVENTION

The present invention has been made to solve the above problems of the prior art.

The present invention provides a magneto-optical disk cartridge which is less affected by deviation of the magneto-optical disk face, and can be made smaller in thickness.

The present invention also provides a magneto-otpical disk apparatus employing the above magneto-optical disk cartridge.

The magneto-optical disk cartridge of the present invention houses a magnetic field modulation type magneto-optical disk, and comprises a main body of the disk cartridge, an aperture provided on the main body of the cartridge, and a shutter for closing the aperture, wherein length W1 of a side of the main body of the cartridge in an opening and closing direction of the shutter, length W2 of a side of the main body of the cartridge in a direction perpendicular to the opening and closing direction of the shutter, length C1 of the aperture in the opening and closing direction of the shutter, and length C2 of the aperture in the direction perpendicular to the opening and closing direction of the shutter satisfy the following inequality relations:

C1<W1/2, C2>W2/2.

The magneto-optical disk apparatus of the present invention for recording and reproducing information to or from a magneto-optical disk housed in a disk cartridge having an aperture and a shutter for closing the aperture comprises an insertion opening for inserting the cartridge, a magnetic field modulation head to be inserted into the aperture to apply modulated magnetic field-to the magneto-optical disk, and an optical pickup movable together with the magnetic field modulation head to project a light beam onto the magnetooptical disk, wherein the directions of access of the magnetic field modulation head and the optical pickup to a target track of the magneto-optical disk, the direction of insertion of the magneto-optical disk cartridge, and the direction of movement of the shutter for opening and closing are parallel to each other.

DETAILED DESCRIPTION OF THE PREFERRED EMBODIMENTS

The present invention is described below in detail by references to the drawings.

Figure 4:
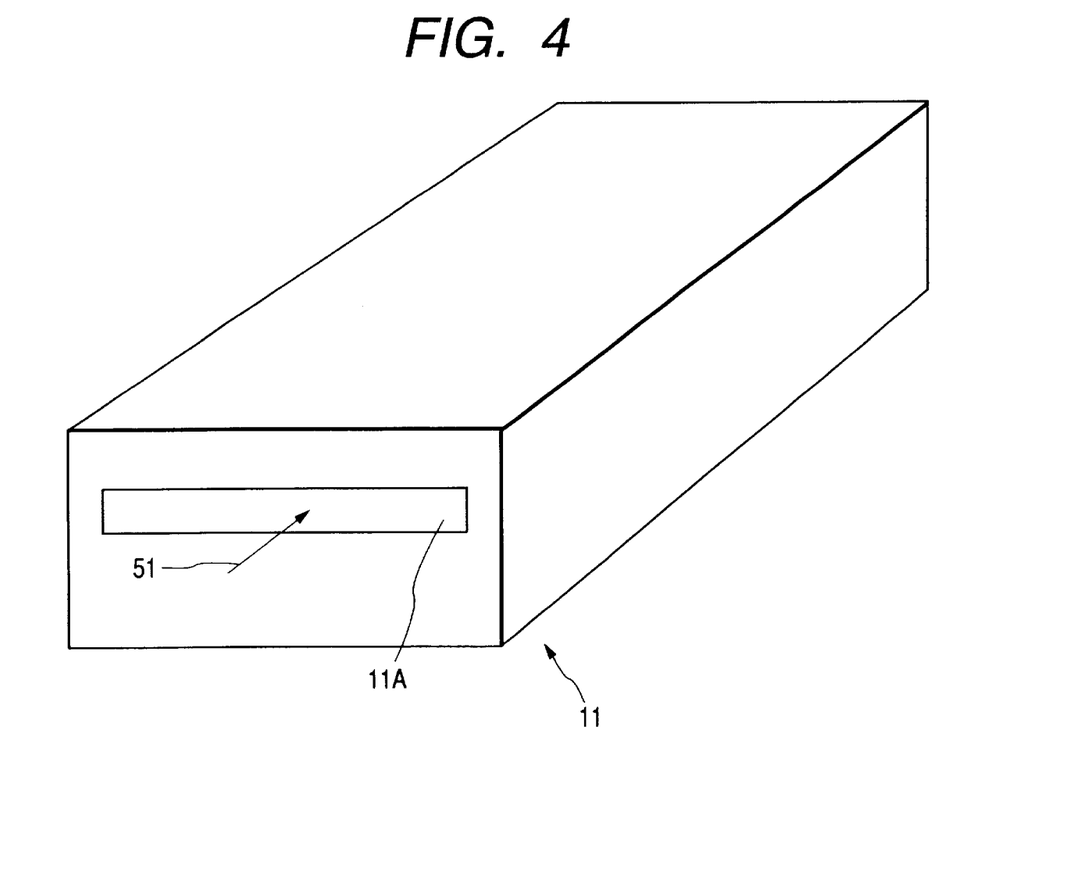
FIG. 4 is a perspective view showing external appearance of a magneto-optical disk apparatus of the first embodiment of the present invention.
Figure 5:
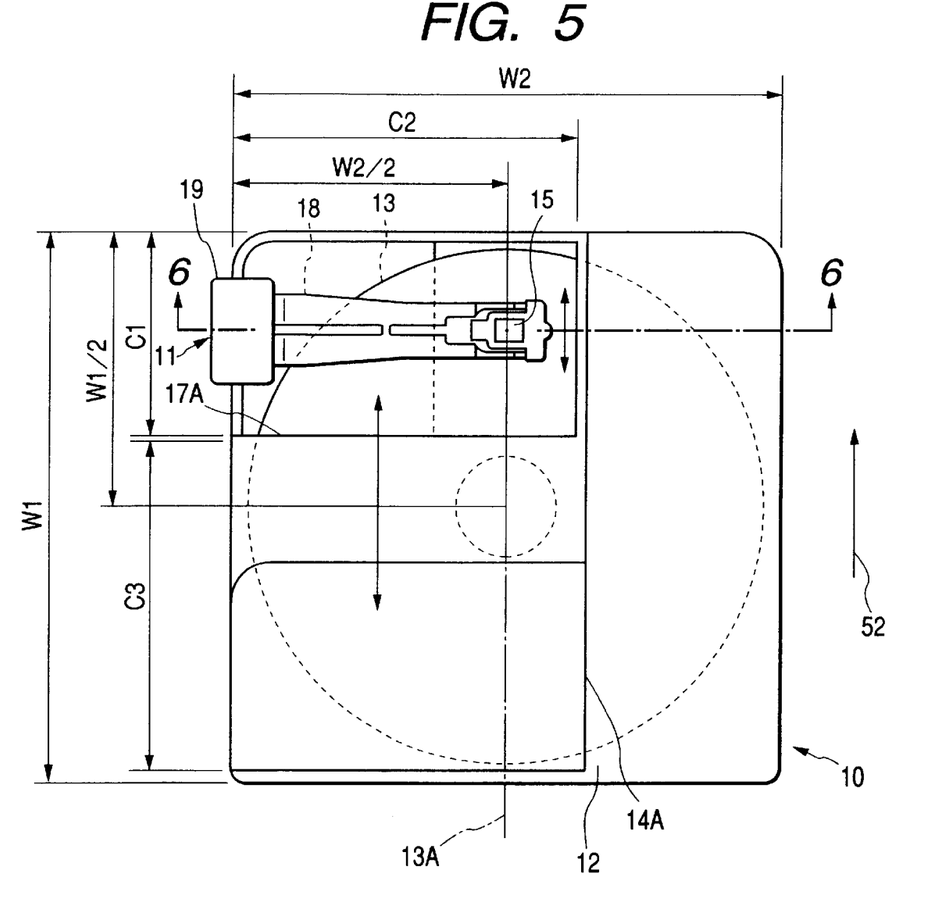
FIG. 5 is a plan view showing the constitution of a magneto-optical disk apparatus of a first embodiment of the present invention.

FIGS. 4 and 5 show a constitution of a first embodiment of the present invention. FIG. 4 is a perspective view showing the external appearance of the overall magneto-optical disk apparatus 11 of the first embodiment. Arrow mark 51 shows the direction of insertion of a cartridge into the magneto-optical disk apparatus. FIG. 5 is a plan view showing a part of the inside of the magneto-optical disk apparatus. Arrow mark 52 shows the direction of insertion of the cartridge into the magneto-optical disk apparatus. Magneto-optical-disk cartridge 10 is constituted to be demountable from magneto-optical disk apparatus 11. Main body 12 of magneto-optical disk cartridge 10 (hereinafter also referred to as "cartridge main body") houses magneto-optical disk 13 rotatably. Information is recorded on, or reproduced from magneto-optical disk 13 of disk cartridge 10 inserted into magneto-optical disk apparatus 11 by application of a magnetic field and projection of a light beam.

Figure 6:
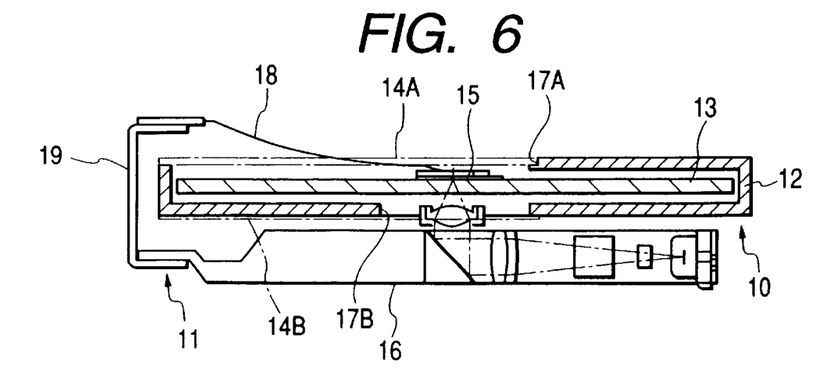
FIG. 6 is a sectional view of the cartridge shown in FIG. 5, taken along line 6—6 during information recording.

On the upper face of main body 12 of the cartridge, aperture 17A in nearly a rectangular shape is provided for insertion of magnetic field modulation head 15 as a magnetic field-generating means. On the lower face of main body 12 of the cartridge, aperture 17B in a rectangular shape is provided for projecting a laser beam from optical pickup 16 onto magneto-optical disk 13. FIG. 6 is a sectional view of the cartridge shown in FIG. 5 taken along line 6—6 during information recording on magneto-optical disk 13.

As magneto-optical disk cartridge 10 is inserted through insertion opening 11A of magneto-optical disk apparatus 11, upper shutter 14A and lower shutter 14B are both forced to slide in the insertion direction to open, and magnetic field modulation head 15 is inserted through aperture 17A into cartridge main body 12 to be in contact with the face of magneto-optical disk 13 as shown in FIG. 6. The center of magnetic field modulation head 15 of magneto-optical disk apparatus 11 is positioned on center line 13A of magneto-optical disk 13. Magnetic field modulation head 15 is fixed with suspension 18 as an elastic force-applying means to support 19. On recording, suspension 18 is inserted into aperture 17A, and applies a modulated magnetic field to magneto-optical disk 13 as shown in FIG. 6.

Figure 7:
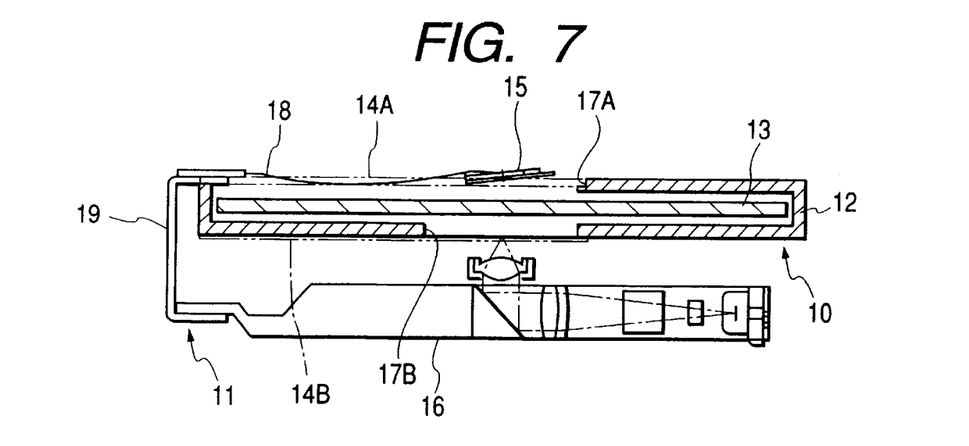
FIG. 7 is a sectional view of the cartridge shown in FIG. 5 taken along line 6—6 when the suspension is brought out to a waiting position.

In a non-recording state, suspension 18 is taken out by a mechanism not shown in the drawing of the apparatus to such a waiting position as shown in FIG. 7. In this state of suspension 18, magneto-optical disk cartridge 10 is inserted into or taken out from magneto-optical disk apparatus 11. Suspension 18 for suspending elastically magnetic field modulation head 15 is fixed at one end to support 19. Optical pickup 16 for projecting a light beam onto magneto-optical disk 13 is also fixed to support 19. This support 19 is moved in the direction parallel to center line 13A of magneto-optical disk 13 by a driving mechanism not shown in the drawing. With this movement, magnetic field modulation head 15 and optical pickup 16 are moved in the radius direction along center line 13A of magneto-optical disk 13 to access the target track on magneto-optical disk 13.

Upper aperture 17A and lower aperture 17B of cartridge main body 12 are uncovered or covered by shutters 14A and 14B, which are moved to shut or open by operation of insertion or discharge of magneto-optical disk cartridge 10. Specifically, with the operation of insertion of disk cartridge 10 into apparatus 11, shutters 14A and 144B come to engage with a protrusion (not shown in the drawing) in apparatus 11 so as to be slid in the insertion direction to automatically uncover apertures 17A and 17B. With the operation of discharge of cartridge 10, shutters 14A, 14B slide in the direction reverse to the direction described above so as to automatically cover apertures 17A and 17B. Shutters 14A and 14B are formed integrally and allowed to slide together.

In this embodiment, aperture 17A on the upper face of cartridge main body 12 is made in a nearly rectangular shape longer in the longitudinal direction of suspension 18 in order to minimize the slanting angle of suspension 18 suspending magnetic field modulation head 15. Specifically, the length W1 of the side of the main body of magneto-optical disk cartridge 10 in a direction of its insertion into magneto-optical disk apparatus 11 (opening-closing movement direction of the shutter), length W2 of the side thereof in a direction perpendicular to the insertion direction, length C1 of the aperture in the insertion direction, and length C2 of the aperture in the direction perpendicular to the insertion direction satisfy the following inequality relations:

$$C1 < W1/2, \ C2 > W2/2.$$

Distance C3 of the movement of shutter 14A for opening or closing the aperture, and length W1 satisfy the following inequality relation:

$$C3 > W1/2$$

Further, the direction of the access of magnetic field modulation head 15 and optical pickup 16 moving in combination with the head to the target track of magneto-optical disk 13, the direction of insertion of disk cartridge 10 into the magneto-optical disk apparatus 11, and the direction of opening-closing movement of shutters 14A and 14B are all parallel to each other.

As described above, aperture 17A is made longer in the longitudinal direction of suspension 18. Thereby, the slanting of suspension 18 can be made less than that of conventional suspension 38, and the height of support 19 can be made smaller than conventional support 39. The lateral displacement ΔX of the head core as mentioned before in the description of the prior art decreases as the slanting of suspension 18 decreases. Thereby, even if a deviation in the face of magneto-optical disk 13 is larger, the area of the head core need not be correspondingly increased and hence it is possible to economize in power consumption and to save heat generation. Furthermore, since the elastic deformation portion of suspension 18 can be made sufficiently longer than that of a conventional one, the spring constant thereof may be made smaller for stable contact pressure of magnetic field modulation head 15 against magneto-optical disk 13, and the spring plate thickness may be increased to increase the strength of the suspension.

Figure 8:
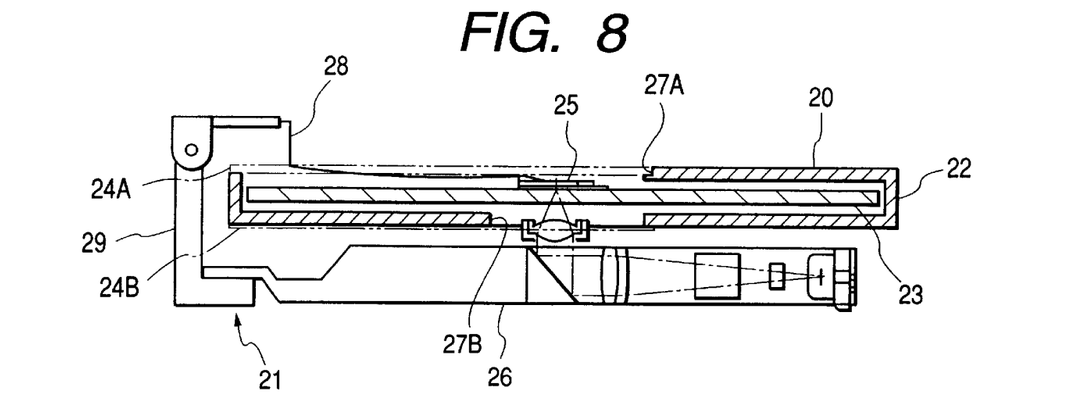
FIG. 8 shows the constitution of the second embodiment of the present invention.

FIG. 8 is a sectional view showing a second embodiment of the present invention. The magneto-optical disk apparatus of this embodiment is of a stationary type. Magneto-optical disk apparatus 21 has the function of recording/reproducing information by application of a modulated magnetic field and projection of a light beam onto magneto-optical disk 23 similarly as in the first embodiment. In FIG. 8, magneto-optical disk cartridge 20, cartridge main body 22, magneto-optical disk 23, shutters 24A and 24B, magnetic field modulation head 25, optical pickup 26, and apertures 27A and 27B correspond respectively to magneto-optical disk cartridge 10, cartridge main body 12, magneto-optical disk 13, shutters 14A and 14B, magnetic field modulation head 15, optical pickup 16, and apertures 17A and 17B in the first embodiment. Accordingly, the second embodiment has the same basic structure as the first one.

Length W1 of the side of the main body of magneto-optical disk cartridge 20 in a direction of its insertion into magneto-optical disk apparatus 21, length W2 of the side thereof in a direction perpendicular to the insertion direction, length C1 of the aperture 27A in the insertion direction, and length C2 of the aperture in the direction perpendicular to the insertion direction satisfy the following inequality relations, similarly as in the above first embodiment:

$$C1 < W1/2, \text{ and } C2 > W2/2$$

Distance C3 of the movement of shutter 24A for opening or closing the aperture, and length W1 satisfy the following inequality relation:

$$C3 > W1/2$$

Further, the direction of the access of magnetic field modulation head 25 and optical pickup 26 moving in combination with the head to the target track of magneto-optical disk 23, the direction of insertion of disk cartridge 20 into the magneto-optical disk apparatus 21, and the direction of opening and closing of shutters 24A and 24B are all parallel to each other.

Figure 9:
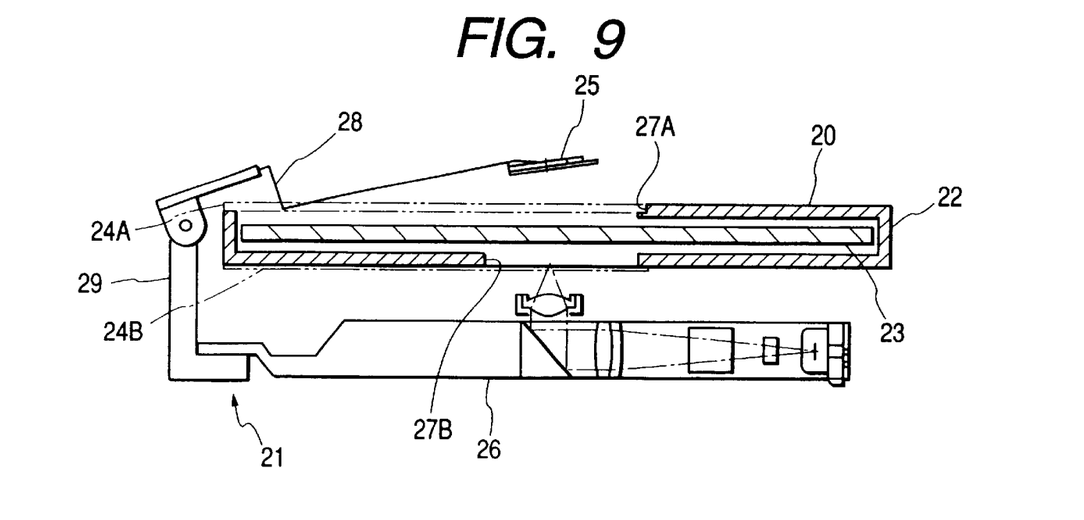
FIG. 9 is a sectional view of the cartridge shown in FIG. 8 when the suspension is brought out to a waiting position.

Suspension 28 is connected to support 29 so as to be turnable on its turning axis. Thereby, magnetic field modulation head 25 at the tip of the suspension 28 is allowed to be positioned on magneto-optical disk 23. This is different from the first embodiment. Further, during recording, the elastic deformation portion of suspension 28 is inserted deeply into the inside of aperture 27A so that the portion becomes nearly parallel to the face of magneto-optical disk 23, as shown in FIG. 8. FIG. 9 illustrates a waiting state of magnetic field modulation head 25 in a non-recording state. In a stationary type of magneto-optical disk apparatus 21, which is not limited strictly in the clearance above the apparatus, suspension 28 can be separated apart from the disk by such a turning mechanism as mentioned above.

In this embodiment, suspension 28 slants little, so that the ability of magnetic field modulation head 25 to follow magneto-optical disk 23 is improved, the influence of any deviation in the face of magneto-optical disk 23 is compensated for more completely, and the power consumption and heat generation are further reduced.

Figure 10:
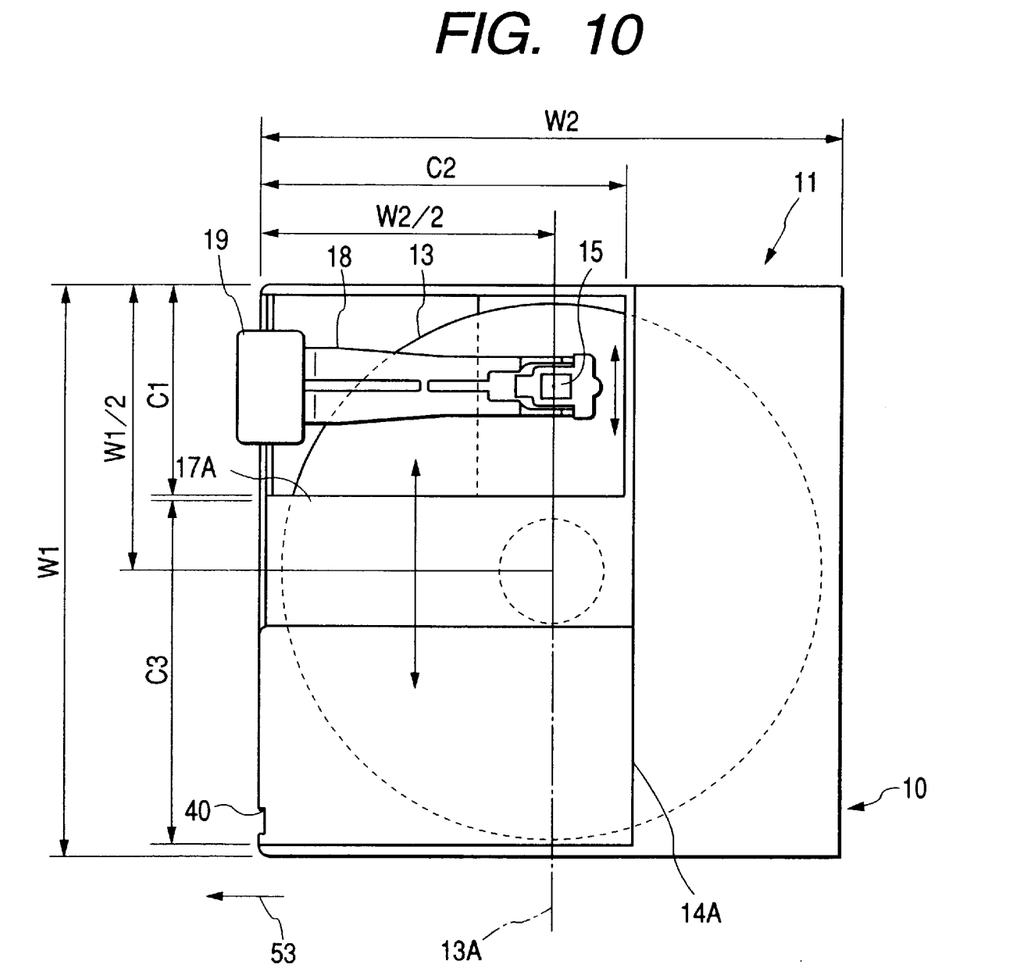
FIG. 10 is a plan view showing the constitution of a magneto-optical disk cartridge of the third embodiment of the present invention.

A third embodiment of the present invention is described below in detail by reference to the drawings. FIG. 10 is a plan view showing the constitution of the third embodiment of the present invention. The same reference numbers as in FIGS. 4 to 7 are used for corresponding members without explanation therefor. Incidentally, arrow mark 53 indicates the direction of insertion of disk cartridge 10 into magneto-optical disk apparatus 11.

This embodiment is different from the first and second embodiments in the opening and closing direction of the shutter provided in the cartridge main body. More specifically, in the first and the second embodiments, the shutter is moved in the direction parallel to insertion of the magneto-optical disk cartridge to uncover and cover the aperture. On the other hand, in this embodiment, the shutter is moved perpendicularly to the insertion direction. The shutter opening-closing mechanism is explained by reference to FIGS. 11 and 12.

Figure 11:
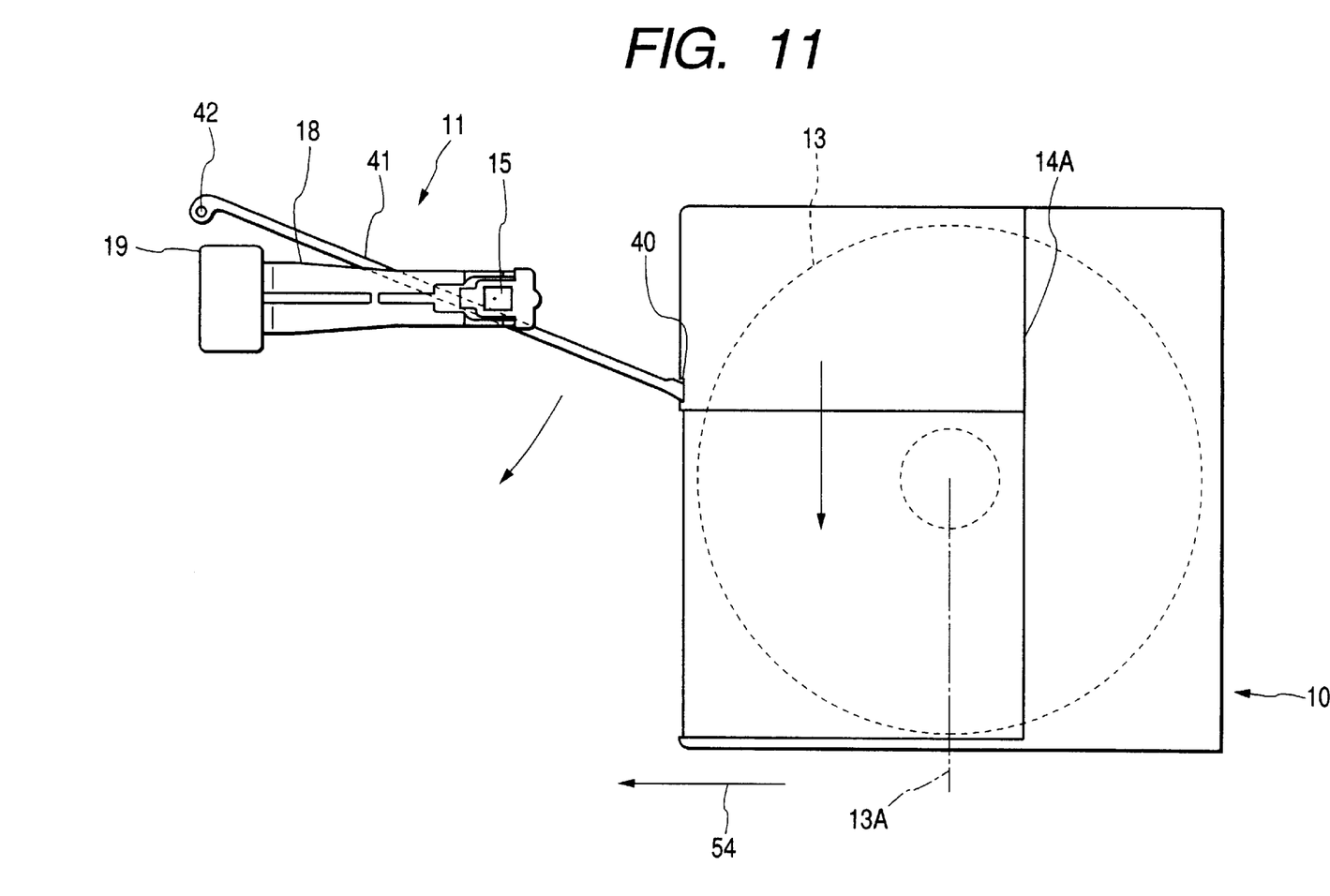
FIG. 11 illustrates a mechanism for opening and closing the aperture of the cartridge shown in FIG. 10.
Figure 12:
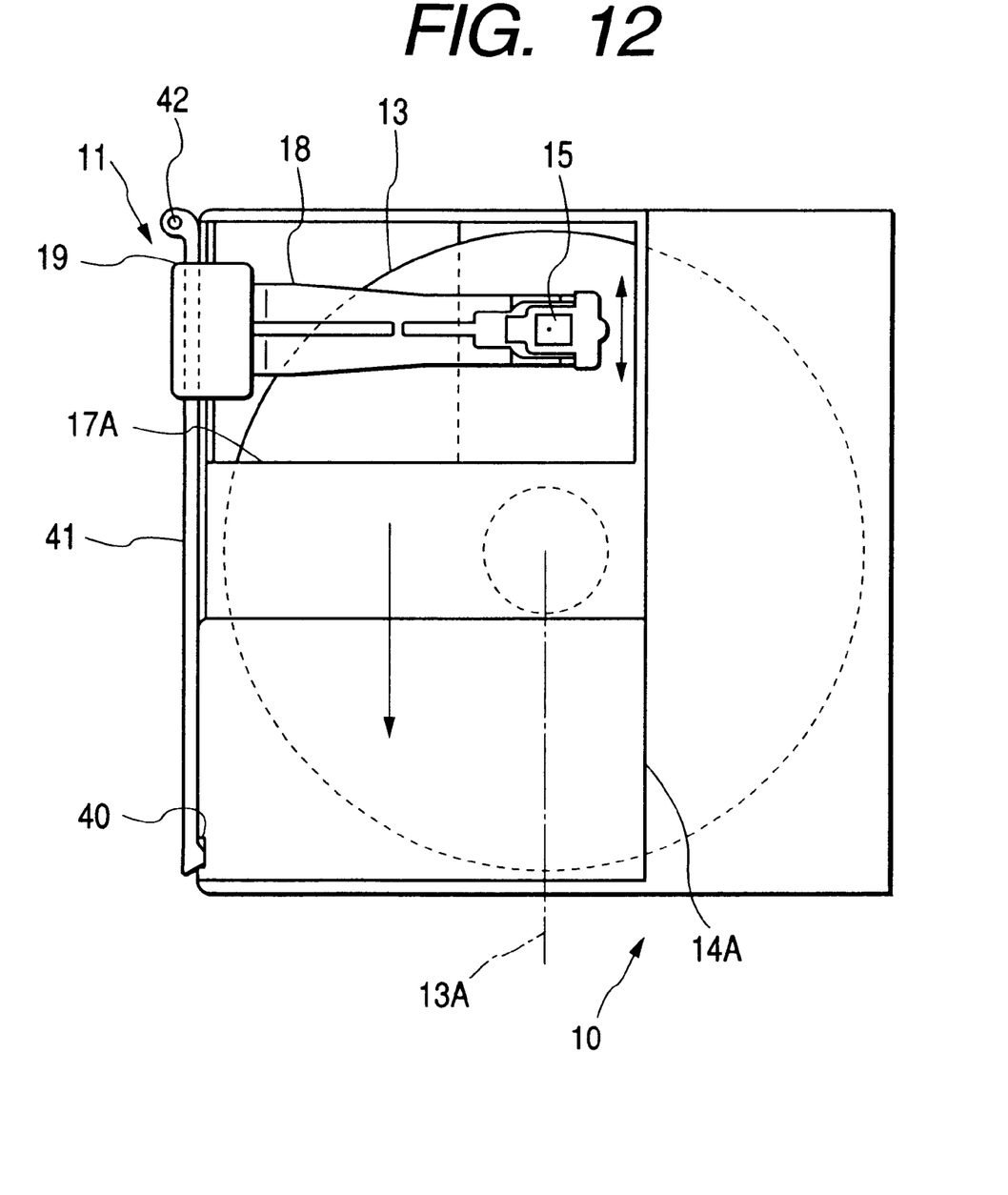
FIG. 12 shows the state of a cartridge having been inserted.

FIG. 11 shows a mechanism for opening and closing shutters 14A and 14B for apertures 17A and 17B. Disk cartridge 10 outside apparatus 11 has apertures 17A and 17B closed with shutters 14A and 14B, respectively. In apparatus 11, shutter-moving lever 41 is provided which turns on fulcrum 42. With insertion of disk cartridge 10 into apparatus 11, the tip of shutter-moving lever 41 comes to engage with nick 40 of shutter 14A so as to turn shutter-moving lever 41 clockwise on fulcrum 42. This turn of shutter-moving lever 41 forces shutter 14A to slide perpendicularly to the direction of insertion of cartridge 10 into apparatus 11 (indicated by arrow mark 54), so as to uncover aperture 17A, as shown in FIG. 12. Shutters 14A and 14B are formed integrally, and move engagedly to make apertures 17A and 17B simultaneously uncovered or covered.

In the third embodiment, the relations of the dimensions of cartridge main body 12 and aperture 17A are as shown below. Length W1 of the side of the main body of magneto-optical disk cartridge 10 in a direction perpendicular to the magneto-optical disk cartridge insertion direction into magneto-optical disk apparatus 11 (opening and closing direction of the shutter), length W2 of the side thereof in the insertion direction, length C1 of the aperture in the direction perpendicular to the insertion direction, and length C2 of the aperture in the insertion direction satisfy the following inequality relations:

$$C1 < W1/2, C2 > W2/2.$$

Distance C3 of the movement of shutter 14A for opening or closing the aperture, and length W1 satisfy the following inequality relation:

$$C3 > W1/2$$

Further, the direction of the access of magnetic field modulation head 15 and optical pickup 16 moving in combination with the head to a target track of magneto-optical disk 13, and the direction of opening and closing movement of shutters 14A and 14B are parallel to each other, whereas the direction of insertion of disk cartridge 10 into the magneto-optical disk apparatus 11 is perpendicular thereto.

In the third embodiment also, the same effects as in the above first and second embodiments can be achieved. The constitution of magnetic field modulation head 15, optical pickup 16, and the related parts may be modified as in the second embodiment.

As described above, according to the present invention, the slanting of the suspension relative to the disk face can be made less. Thereby, the lateral displacement of the magnetic field modulation head caused by its vertical deviation can be made less. Therefore, even when a deviation of the face of the magneto-optical disk is large, the head core is allowed to follow the target track precisely with the area of the head core unchanged. Thereby, the power consumption and heat generation can be kept low. The height of the support for the suspension can be made smaller, which enables a smaller thickness of the magneto-optical disk apparatus.

Further, according to the present invention, the elastic deformation portion of the suspension can be made longer, whereby the spring constant may be smaller so as to improve the following (tracking) ability and to increase the strength of the suspension. While the access direction of the magnetic field modulation head and the optical pickup to a target track of the magneto-optical disk and the direction of insertion of the disk cartridge into the magneto-optical disk apparatus may be parallel or perpendicular to each other, the opening-closing direction of the shutter is parallel to the access direction, which enables a decrease in the dimension of the depth of the apparatus so as to make the apparatus thinner and smaller.

What is claimed is:

1. A magneto-optical disk cartridge housing a magnetic field modulation type magneto-optical disk comprising:

a main body of the disk cartridge;

an aperture provided on the main body of the cartridge; and a shutter for opening and closing the aperture;

wherein a length $W1$ of a side of the main body of the cartridge in an opening and closing direction of the shutter, a length $W2$ of a side of the main body of the cartridge in a direction perpendicular to the opening and closing direction of the shutter, a length $C1$ of the aperture in the opening and closing direction of the shutter, and a length $C2$ of the aperture in the direction perpendicular to the opening and closing direction of the shutter satisfy the following inequality relations:

$$C1<W1/2, C2>W2/2$$

and wherein a distance $C3$ of movement of the shutter for opening or closing the aperture and the length $W1$ satisfy the following inequality relation:

$$C3>W1/2.$$

2. The magneto-optical disk cartridge according to claim 1, wherein a direction the shutter moves for opening and closing the aperture is the same as the direction of insertion of the main body of the disk cartridge into a magneto-optical disk apparatus.

3. The magneto-optical disk cartridge according to claim 1, wherein a direction the shutter moves for opening and closing the aperture is perpendicular to the direction of insertion of the main body of the disk cartridge into a magneto-optical disk apparatus.

4. A magneto-optical disk apparatus for recording and reproducing information to or from a magneto-optical disk housed in a disk cartridge having an aperture and a shutter for opening and closing the aperture, comprising:

an insertion opening for inserting the cartridge;

a magnetic field modulation head to be inserted into the aperture to apply modulated magnetic field to the magneto-optical disk; and an optical pickup movable together with the magnetic field modulation head to project a light beam onto the magneto-optical disk;

wherein the directions of access of the magnetic field modulation head and the optical pickup to a target track of the magneto-optical disk, and the direction of movement of the shutter for opening and closing the aperture are parallel to each other.

\* \* \* \* \*

UNITED STATES PATENT AND TRADEMARK OFFICE
CERTIFICATE OF CORRECTION

PATENT NO.   : 6,411,596 B1
DATED        : June 25, 2002
INVENTOR(S)  : Osamu Nagatsuka It is certified that error appears in the above-identified patent and that said Letters Patent is hereby corrected as shown below:

Column 2,
Line 55, "field-to" should read -- field to --.

Signed and Sealed this

Twenty-first Day of January, 2003

JAMES E. ROGAN
*Director of the United States Patent and Trademark Office*